E. A. CHENARD.
DISTILLING APPARATUS.
APPLICATION FILED MAY 5, 1913.
1,307,184. Patented June 17, 1919.
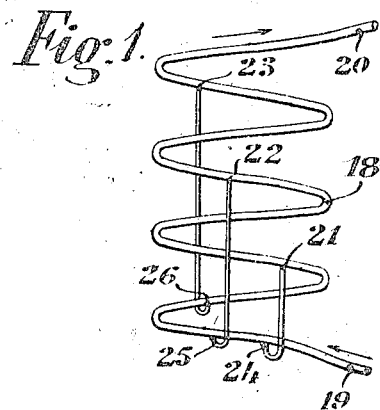
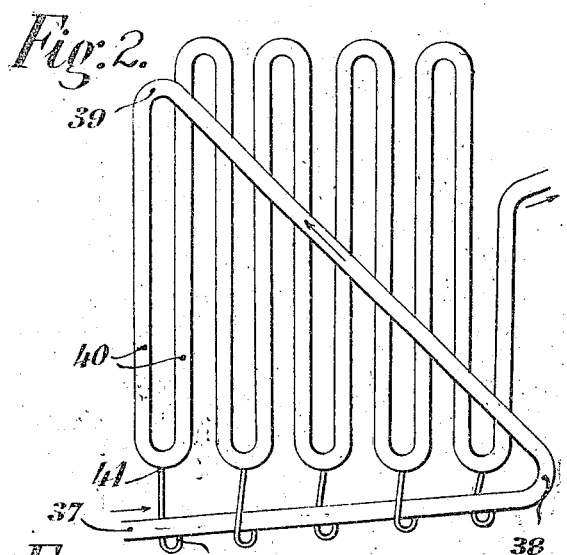
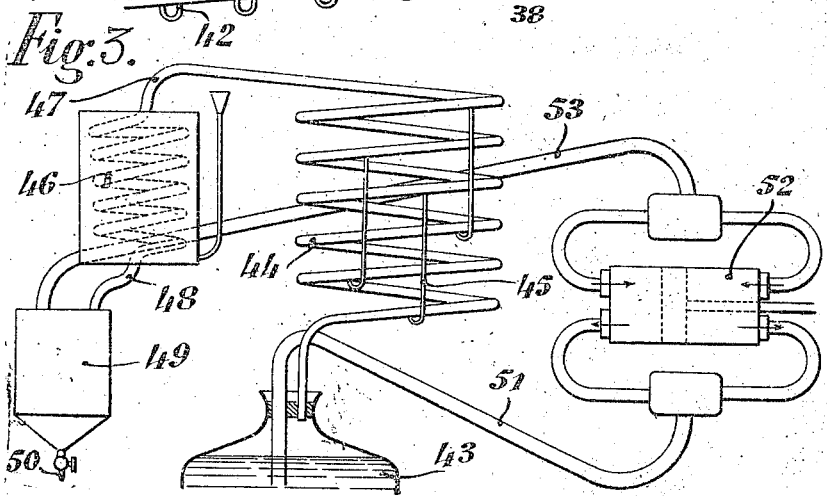

UNITED STATES PATENT OFFICE.

EMILE ANDRÉ CHENARD, OF COGNAC, FRANCE.

DISTILLING APPARATUS.

1,307,184.   Specification of Letters Patent.   Patented June 17, 1919.

Application filed May 5, 1913. Serial No. 765,644.

*To all whom it may concern:*

Be it known that I, EMILE ANDRÉ CHENARD, a citizen of the French Republic, residing at Cognac, in the Republic of France, have invented certain new and useful Improvements in Distilling Apparatus, of which the following is a specification.

This invention relates to improvements in the apparatus used in the distillation and rectification of liquids which are composed principally of water and ethyl alcohol, or of mixtures of liquids, which mixtures possess thermodynamic properties similar to those of mixtures of alcohol and water.

I have discovered that in the distillation and rectification of such mixtures an extremely important rôle is played by what I term the kinetic and adiabatic fractionation or analysis of the mixture of vapors proceeding from the liquid undergoing distillation.

The properties of such mixed vapors have hitherto been described in a very incomplete manner only. Herefrom results the possibility of considerable improvements in the apparatus used in laboratories and factories for fractional distillation. I have discovered that the apparatus used should fulfil the following conditions:—

1.—The vapors which travel between a source of heat and a source of cold must always perform, against the outer pressure, work which results in a loss of internal heat and which consequently is accompanied by partial condensations. These effects can be easily obtained with very slight variations of the tension of the vapors between the still and the condenser. They differ clearly and distinctly from the well known effects of sudden expansion and they are measured as functions of the mechanical work effected, whichever may be the form of the apparatus used. The movement of the vapors, even with a very slight pressure difference between the point from which it proceeds and that to which it moves thus involves internal work. The loss in internal heat and resulting partial condensation is a progressive phenomenon which continues with movement of the vapors. The effect of the loss of heat upon the several constituents of the vapor results in their condensation in different proportions, and thus the composition of the vapors is gradually changed thereby.

2.—The fractionation by internal cooling and partial condensation thus produces molecular groupings which widely differ by their chemical composition from those indicated in the vaporization tables ordinarily regarded as accurate. Herefrom it results that the liquids of condensation can be used advantageously for the cooling of the vapors in different parts of the apparatus, provided devices are used which are well adapted for this work. Without formulating a mathematical law upon this point, the following may be stated:—

(*a*) The best fractionation by vaporization is obtained by bringing the vapors as quickly as possible away from the generating liquid;

(*b*) The best fractionation by condensation is obtained by bringing the liquids of condensation as quickly as possible away from the generating vapor.

The apparatus hereinafter described conforms to these conditions in combining the following characteristic features:—very slight variation of pressure between the still and the cooling apparatus:—devices permitting the free circulation of the vapors and the free exercise of the resistance of the exterior pressure:—rapid movement, by means of special conduits, of the liquids of condensation to bring them back in the same order into contact with the ascending vapors:—development of the apparatus in horizontal direction with small vertical dimensions.

In the accompanying drawings:—

Figure 1 shows in elevation a serpentine pipe constructed according to this invention.

Fig. 2 shows in elevation another form of apparatus.

Fig. 3 shows in elevation a device analogous to that of Fig. 1 in an optional arrangement wherein distillation and condensation is effected in the presence of gases.

Fig. 1 represents a long pipe 18 of uniform cross section and of serpentine form into which the vapors to be analyzed flow from the still at the lower end 19 and travel freely against the external pressure, to flow out at 20 to go to the cooling apparatus. The mechanical work which the vapors effect in the serpentine pipe results in condensates which are collected by small inverted siphons 21—24, 22—25, 23—26 which conduct the condensates back into contact with the ascending vapors at the lower part of the serpentine pipe in the same order.

It is evident that in the form of apparatus hereinbefore described even considerable differences of density cannot sensibly interfere with the separation of the vapors to be analyzed and these apparatus can be used for almost any cases of fractional distillation.

Fig. 2 represents another form of apparatus intended for use when the relative movement due to different specific gravities of the constituents of the vapor can have only unimportant effects; for example, with vapors of benzene and toluene, which have almost the same specific gravities. The vapors enter at 37 into a cylindrical conduit curved at 38 and 39, and which leads into a series of U-shaped pipes 40 as shown in the drawing. The condensates which settle on the inner walls thereof flow down said walls and are collected at the lower end of the U's in inverted siphons 41– 42, which return them to the conduit for the ascending vapors at points situated in the same relative order as the condensates were formed. The contact of the condensates with the ascending vapors tends to cool the latter and vaporize the former.

Fig. 3 illustrates an optional arrangement embodying the apparatus of my invention wherein distillation and condensation is effected with the aid of gases, such as oxygen, nitrogen, carbon dioxid, and the like.

In the arrangement of Fig. 3, 43 is a still upon which is mounted a fractionating device constructed in accordance with my invention and resembling that of Fig. 1, said fractionating device comprising a serpentine pipe 44 of slight pitch and inverted siphon tubes 45 which return condensates to the anterior portions of the fractionating device in the order of their formation. Vapors passing from the fractionating device pass through pipe 47 into condenser 46, from which condensate and uncondensed vapors flow through pipe 48 into vessel 49. Condensates may be drawn off through valve 50. A pump 52 communicates with still 43 through pipe 51 and with vessel 49 through pipe 53.

Before starting operations the entire apparatus is filled with a suitable gas, such as those above named. The pump, which exhausts from receptacle 49 and discharges into the liquid in still 43 causes a continual circulation of said gas. The flow of gas through the liquid aids in its ebullition. The mixed gases and vapors pass through the fractionating coil 44 and into condenser 46. The condensate and gases collect in receptacle 49, the former being drawn off at 50 and the latter by the pump 52 through pipe 53.

The same device may also, as is readily apparent, be utilized for operation under reduced pressure.

My apparatus may be provided with a covering of heat insulating material, inasmuch as the phenomenon which produces the fractional condensation or analysis of the vapors is not one of cooling by external means, but is an internal cooling produced kinetically by the movement of the vapors themselves, and without substantial differences in pressure. It is in each case designed to be interposed in the distillation system between the still wherein the vapors are produced and the condenser.

Having clearly described and illustrated my invention and without limitation to the specific forms of apparatus shown herein, I claim:—

1. A device for the analytical condensation of mixed vapors to be interposed between a vapor producing device and a condensing device comprising in combination a long conduit slightly inclined at all points of uniform cross section, branch tubes for leading the liquid condensed in portions of the conduit more remote from the vapor producing device to portions of the conduit relatively close thereto and in the same order for subjecting said condensed liquid to the action of ascending vapors of higher temperature.

2. A device for the analytical condensation of mixed vapors to be interposed between a vapor producing device and a condensing device comprising a serpentine conduit of uniform cross section having a pitch at a slight angle from the horizontal, tubes leading from parts of said conduit more remote from the vapor producing device to parts thereof relatively close thereto and in like relative positions for returning condensed liquids and subjecting them to the action of ascending vapors of higher temperature.

In witness whereof I have hereunto set my hand in the presence of two witnesses.

EMILE ANDRÉ CHENARD.

Witnesses:
G. LERRAUT,
GASTON SODEAU.